United States Patent
McPherson et al.

(10) Patent No.: US 10,146,658 B2
(45) Date of Patent: Dec. 4, 2018

(54) USER DEVICE POWER CONSUMPTION MONITORING AND ANALYSIS

(71) Applicant: T-Mobile USA, Inc., Bellevue, WA (US)

(72) Inventors: Zachary McPherson, Bellevue, WA (US); Kranthi Sontineni, Renton, WA (US); Jie Hui, Mercer Island, WA (US); Samson Kwong, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 199 days.

(21) Appl. No.: 15/211,795

(22) Filed: Jul. 15, 2016

(65) Prior Publication Data

US 2017/0017295 A1 Jan. 19, 2017

Related U.S. Application Data

(60) Provisional application No. 62/193,463, filed on Jul. 16, 2015.

(51) Int. Cl.
*G06F 1/00* (2006.01)
*G06F 11/34* (2006.01)
(Continued)

(52) U.S. Cl.
CPC .......... *G06F 11/3476* (2013.01); *G06F 11/24* (2013.01); *G06F 11/3062* (2013.01);
(Continued)

(58) Field of Classification Search
CPC .. G06F 11/3476; G06F 11/24; G06F 11/3062; G06F 11/3414; G06F 1/3287; G06F 17/40; G06F 11/3467
(Continued)

(56) References Cited

U.S. PATENT DOCUMENTS

2010/0231383 A1 9/2010 Levine et al.
2011/0040996 A1* 2/2011 Hackborn ........... G06F 11/3409
713/340

(Continued)

OTHER PUBLICATIONS

"International Search Report and Written Opinion" for PCT Application No. PCT/US2016/042615 dated Nov. 21, 2016, 19 pages.

*Primary Examiner* — Austin Hicks
(74) *Attorney, Agent, or Firm* — Han Santos, PLLC

(57) ABSTRACT

The power consumption of a user device may be monitored as an application on the user device performs one or more actions. Device commands for the user device and monitoring commands for a power monitor may be generated based on a script. The script is created to trigger an application on a user device to perform one or more actions while power consumption of the user device is monitored. The device commands are sent to the application on the user device to trigger the application to perform the one or more actions. The monitoring commands are sent to the power monitor to command the power monitor to track the power consumption of the use device as the application performs one or more actions. Subsequently, power consumption data for the user device are received from the power monitor, and device event data are received from the user device for analysis.

20 Claims, 9 Drawing Sheets

(51) Int. Cl.
*G06F 17/40* (2006.01)
*G06F 11/24* (2006.01)
*G06F 11/30* (2006.01)

(52) U.S. Cl.
CPC .......... *G06F 11/3414* (2013.01); *G06F 17/40* (2013.01); *Y02D 10/34* (2018.01)

(58) Field of Classification Search
USPC ........................................................ 713/100
See application file for complete search history.

(56) References Cited

U.S. PATENT DOCUMENTS

| | | | |
|---|---|---|---|
| 2012/0011378 A1* | 1/2012 | Dalton | G06F 11/3062 713/300 |
| 2012/0260111 A1 | 10/2012 | Tarkoma | |
| 2013/0031599 A1 | 1/2013 | Luna et al. | |
| 2013/0114485 A1 | 5/2013 | Vannithamby et al. | |
| 2013/0179973 A1* | 7/2013 | Du | G06F 21/81 726/24 |
| 2014/0282425 A1 | 9/2014 | Zhao et al. | |

* cited by examiner

USER DEVICE POWER CONSUMPTION MONITORING AND ANALYSIS

CROSS REFERENCE TO RELATED PATENT APPLICATION

This application claims priority to U.S. Provisional Patent Application No. 62/193,463, filed on Jul. 16, 2015, entitled "User Device Battery Consumption Monitoring and Analysis," which is hereby incorporated by reference in its entirety.

BACKGROUND

Wireless communication devices are integral to the daily lives of most users. Wireless communication devices are used to make voice calls, check email and text messages, update social media pages, stream media, browse websites, and so forth. Since wireless communication devices are powered by batteries, battery life may be a concern for application designers that develop applications for these wireless communication devices. A well-designed application may help to extend the battery life of a wireless communication device, thereby providing the user with mobile productivity while reducing the inconvenience associated with recharging the wireless communication device at a stationary power source having to carry additional battery packs. However, a poorly designed application may cause excessive battery drain and shorten the time that the wireless communication device can remain untethered to the stationary power source.

Conventional testing of an application that executes on a wireless communication device may rely on human testers to perform tests, in which each test may be a series of simulated usage of the application. A human tester may interact with the wireless communication device to simulate turning on and off application functionalities and using features of the application at predetermined times according to a set of designated test criteria. The power consumption of the application may be monitored during these tests to assess the energy efficiency of the application. However, variations in the performance of different human testers that implement a particular test, as well as variability in the way that a single human tester carries out multiple sessions of the same test, may lead to unreliable or unrepeatable power consumption result.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
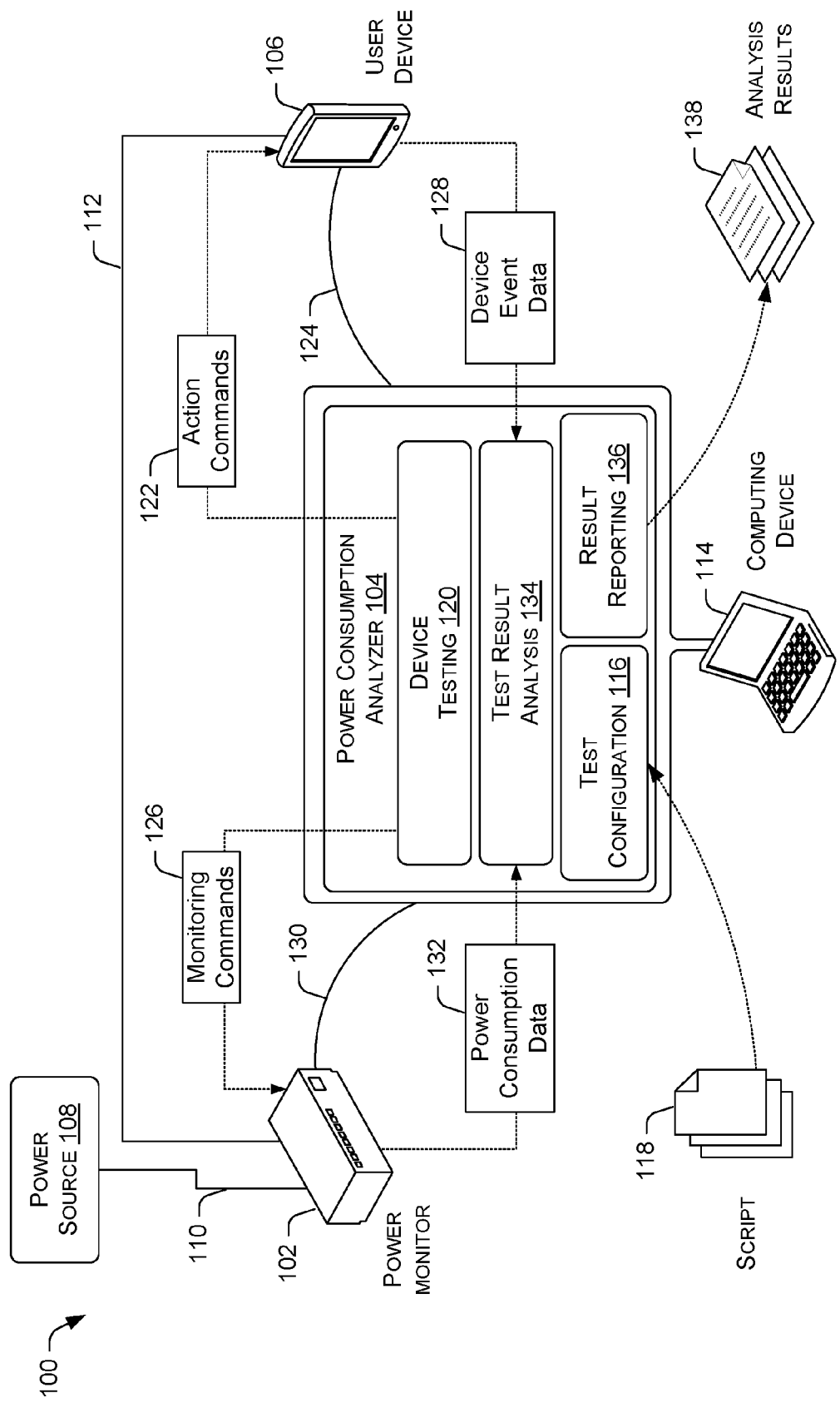
FIG. 1 illustrates an example architecture for user device power consumption monitoring and analysis.

This disclosure is directed to techniques for using a power consumption analysis application to monitor and analyze the power consumption of a user device. The power consumption analysis application may use action commands to trigger the user device to perform a test sequence of actions or individual actions that affect one or more applications on the user device. Further, the power consumption analysis application may use monitoring commands to activate a power monitor to track the power consumption of the user device as the test sequence of actions or individual actions are performed.

Following the execution of a test sequence, the user device may return device event data to the power consumption analysis application. The device event data may include information on functions that are performed in response to the actions, application events that are triggered by the actions, data that are received or transmitted by applications in response to the actions, application function errors that occurred in response to the actions, and/or so forth. As used herein, applications may refer to applications that are installed on an operating system for execution, the operating system itself, and/or any other software components installed on the user device. Furthermore, the power monitor may return power consumption data to the power consumption analysis application. The power consumption data may show fluctuations in the amount of power being consumed by the user device over a time period as the test sequence or individual actions are performed. The power consumption analysis application may analyze the device event data and the power consumption data to determine the amount of power that is consumed for a specific test sequence or a particular action. The amount of power that is consumed may be compared to an expected amount of power that is stored in a battery of the user device to determine how the power consumption affects battery life.

Other analyses may provide average power consumption by a user device for repeated test sequences or individual actions, show a power consumption difference between a baseline device and the user device for the same power consumption test, and/or so forth. The analyses may further correlate power consumption during the performance of a test sequence or an action in a test sequence with other events, such as the execution of background applications, data upload or download failures or retries, occurrence of application function errors due to software bugs, and/or so forth.

In at least one embodiment, device commands for the user device and monitoring commands for a power monitor may be generated based on a script. The script is created to trigger at least one application on a user device to perform one or more actions while power consumption of the user device is monitored. The device commands are sent to the user device to trigger the user device to perform the one or more actions. The actions may be performed by one or more applications on the user device. The monitoring commands are sent to the power monitor to command the power monitor to track the power consumption of the use device as user device performs one or more actions. Subsequently, power consumption data for the user device are received from the power monitor, and device event data are received from the user device for analysis.

The analysis of power consumption by the user device over time as a result of test sequences or individual actions in relation to device events may provide insight into device factors that adversely or disproportionally affect the battery life of the user device. For example, an application component of a poorly written application may cause the application to freeze during execution, thereby causing excessive power consumption as the application component repeatedly performs the same erroneous function. In another example, an overly complex web page may cause a web browser application on the user device to download an excessive amount of data, in which such data downloads result in undesired battery drainage. In an additional example, an application may be configured to automatically execute in the background upon the occurrence of a specific application event on the user device. However, the execution of the background application may cause an unforeseen power consumption that shortens the battery life of the user device. In a further example, a high number of data packet losses or data packet downloads due to the lack of adequate telecommunication network signal or signal interference may be correlated with high power consumption by the user device.

Thus, the techniques for performing detailed analysis of power consumption by a user device may enable application designers, web developers, network engineers, or service providers to identify root causes of short battery life for user devices. As a result, applications, web pages, telecommunication network infrastructure, as well other components may be modified or improved to provide optimal battery life for user devices. The techniques described herein may be implemented in a number of ways. Example implementations are provided below with reference to the following figures.

Example Architecture

FIG. 1 illustrates an example architecture 100 for implementing pathway-based data interruption detection. The architecture 100 may include a power monitor 102 and a power consumption analyzer 104. The power monitor 102 and a power consumption analyzer 104 may monitor power consumption of the user device 106 as the device undergoes power consumption test sequences. The power monitor 102 may be a standalone device that is deployed to transfer electronic power supplied by a power source 108 to the user device 106. In various embodiments, the provided power may be direct current (DC) that is supplied to the user device 106 via a set of power leads (sometimes configured as a dummy battery) that connect directly to the battery terminals of the user device 106. For example, the power monitor 102 may be connected to the power source 108 via a set of conductive wires 110. In turn, the power monitor 102 may supply electrical power to the user device 106 via conductive leads 112. In some instances, the power source 108 may be equipped with power modulation or conversion circuits to transform the electrical power into a form that is usable by the user device 106. The transformation may include voltage conversion, current conversion, rectification, and/or so forth that are performed based on the power specifications of the user device 106. Additionally, the power monitor 102 may be equipped with hardware and software components that monitors the amount of electrical power that is consumed by the user device 106 over a period of time. In various embodiments, the power monitor 102 may capture the consumption of electrical power over the period of time as current drain, in which the current drain may be measured in milliampere hour (mAh).

The power consumption analyzer 104 may be an application that executes on one or more computing devices 114. Each computing device 114 may be a general purpose computer, such as a desktop computer, a tablet computer, a laptop computer, a server, and so forth. However, in other embodiments, the computing device 114 may be a smart phone, a game console, or any other electronic device. In operation, the power consumption analyzer 104 may initially perform test configuration 116. In test configuration 116, the power consumption analyzer 104 may prepare a script 118 that prompt the user device 106 to perform a test sequence of one or more actions and prompt the power monitor 102 to monitor the power consumption of the user device 106 during the test sequence. In some instances, the script 118 may be imported into the power consumption analyzer 104 for execution. In other instances, the power consumption analyzer 104 may provide a script editor interface that enables a user to create the script 118 or modify the script 118.

During device testing 120, the power consumption analyzer 104 may convert a test sequence for the user device 106 into action commands 122. The action commands 122 may be transmitted to the user device 106 via a communication connection 124 between the computing device 114 and the power monitor 102. In various embodiments, the communication connection 124 may be a serial interface, a universal serial bus (USB) interface, or another communication interface. The action commands 122 may cause the user device 106 to perform actions. The actions may include inputting data into an application, activating or deactivating application features of an application on the user device, initiating and terminating the uploading or downloading of data from a network, turning on or off hardware components of the user device 106 via the application, and/or so forth. In various implementations, the action commands 122 of a test sequence may cause an action to be executed repeatedly on a consecutive basis or non-consecutively with other actions in order to simulate normal usage of the user device 106 by a user. Further, a test sequence may be performed repeatedly on the user device 106 for the purpose of verifying testing procedures or test results. The user device 106 may send device event data 128 following the performance of each test sequence.

The device event data 128 may include event data that are captured by event loggers, debugger applications, as well as components in the various network stack layers of the user device 106. The device event data 128 may be captured as one or more actions are performed by the user device 106 in response to the device command. For example, if the particular action is to turn off the Wi-Fi of a user device, the device event data may indicate that the Wi-Fi transceiver of the user device is turned off. Each of these applications and components may capture the event data by default, or may have been installed and configured in advance on the user device 106 to capture the event data. The network stack layers may include an application layer, a transport layer, a network layer, a data link layer, and a physical layer. The link layer may include a radio resource control (RRC) layer and/or a radio link control (RLC) layer. Thus, the device event data 128 may include system event reports, bug reports, data traffic logs, data packet traces, and/or so forth. For example, the event data may include LogCat data, PCAP data, and bug reports that are produced by the Android operating system. The device event data 128 may be captured and transmitted to the power consumption analyzer 104 by one or more device monitoring applications that are natively built into the user device 106 and/or add-on applications that are installed in advance on the user device 106. The device event data 128 may be transmitted to the power consumption analyzer 104 via the communication connection 124.

As a further part of device testing 120, the power consumption analyzer 104 may send the monitoring commands 126 in the script 118 to the power monitor 102. The monitoring commands 126 may be sent via a communication connection 130 between the power monitor 102 and the computing device 114. In various embodiments, the communication connection 130 may be a serial interface, a universal serial bus (USB) interface, or another communication interface. The monitoring commands 126 may prompt the power monitor 102 to capture power consumption data 132. The power consumption data 132 may indicate power drain, e.g., amperage drain, over a period of time that coincides with the test sequence. The power monitor 102 may transmit the power consumption data 132 to the power consumption analyzer 104 via the communication connection 130.

Once the power consumption analyzer 104 has received the device event data 128 and the power consumption data 132, the power consumption analyzer 104 may perform test result analysis 134. In test result analysis 134, the power consumption analyzer 104 may user the device event data 128 and the power consumption data 132 to determine the amount of energy that is consumed for a specific test sequence or a particular action in a test sequence. The amount of power that is consumed may be compared to an expected amount of power that is stored in a battery of the user device to determine how the power consumption affects battery life.

In additional embodiments, the power consumption analyzer 104 may also use the device event data 128 and the power consumption data 132 to provide average power consumption by a user device for repeated test sequences or actions. The analysis may also show variances in power consumption by different devices for the same test sequence or action, by different versions of applications for the same test sequence or action, and/or so forth. In some scenarios, the power consumption data 132 may be compared with power consumption data for another baseline device that underwent an identical power consumption test. Such a comparison may show a power consumption difference between the baseline device and the user device 106 due to hardware and/or software differences between the devices. In further instances, the power consumption of the user device 132 as reflected in the power consumption data 132 may be correlated with other events. These events may include the execution of background applications, data upload or download failures or retries, occurrence of application function errors due to software bugs. The correlation of such data may reveal or corroborate unforeseen impact of device settings, application settings, interactions between multiple applications, external factors such as network congestion or errors or web page configurations, and/or so forth.

During result reporting 136, the power consumption analyzer 104 may compile analysis results 138 based on the analytical data obtained using test result analysis 134. The analysis results 138 may be presented in various forms. In some instances, the results may be presented in report form. For example, the amount of power drain due to the performance of individual actions in a test sequence may be numerically presented. Alternatively or concurrently, the analysis results 138 may be presented in graphical form. For example, the amount of power drain due to individual actions in a test sequence may be graphically correlated with each action. In various embodiments, the power consumption analyzer 104 may present the analysis results 138 via a display device, a printed document, and/or so forth. Thus, the architecture 100 provides the flexibility of testing the power consumption of the user device 106 for a test sequence of actions or individual actions that are performed on the user device 106.

The execution of a script 118 using the power consumption analyzer 104 on the computing device 114 may provide multiple advantages over performing a power consumption by using the user device 106 to execute the script 118. For example, the use of the computing device 114 isolates power usage with respect to the execution of the test itself, as the test is performed using a processor that is separate from the user device 106. This may eliminate the use of sleep timers, in between code, user interfaces, and multithreading on the user device 106, which produces more consistent power consumption test results for the user device 106.

For example, when using a batch script on the user device 106, the sleep timers may render the user device 106 non-responsive for periods of time. Further, when the user device 106 is attempting to multithread, the script may try to inject multiple commands at the same time. Likewise, when the script is executed via a separate thread on the user device 106, it may be difficult to quantify the power usage that was used to run everything else unassociated with the script itself. However, by using the power consumption analyzer 104 on the computing device 114, a power consumption test script may be executed without adding additional processing burden or power consumption to the user device 106. Further, because the script is designed to send a single action command to the user device 106 at a time, the use of the power consumption analyzer 104 may minimize the overall impact of script execution on the power consumption of the user device 106.

Example Device Components

Figure 2:
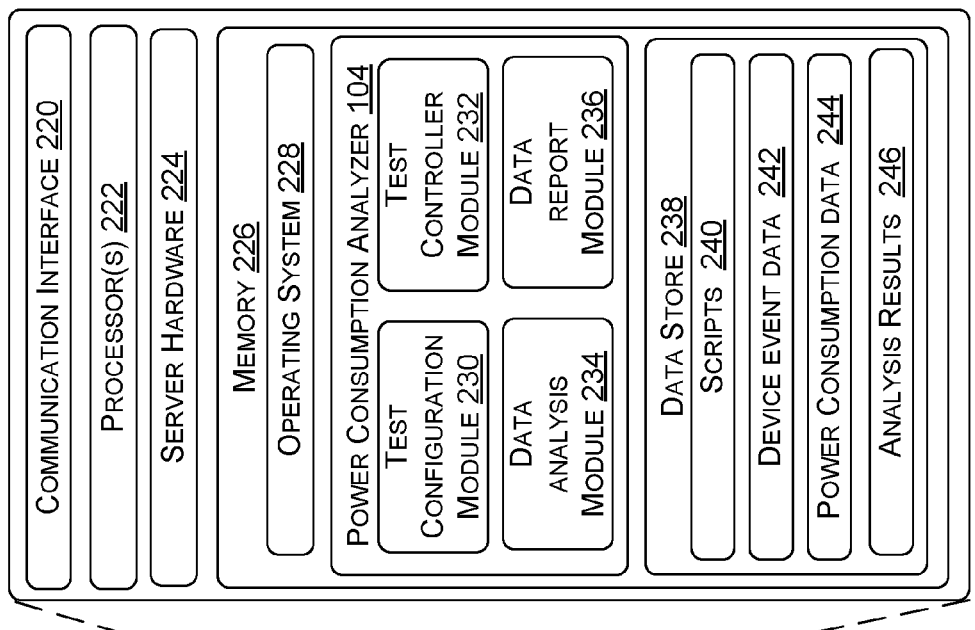
FIG. 2 is a block diagram showing various components of an illustrative user device that monitors and analyzes the power consumption of a user device.

FIG. 2 is a block diagram showing various components of the user device 106 and the computing device 114 that monitors and analyzes the power consumption of the user device 106. The user device 106 may include a communication interface 202, one or more sensors 204, a user interface 206, one or more processors 208, and memory 210.

The communication interface 202 may include wireless and/or wired communication components that enable the electronic device to transmit or receive voice or data communication via a wireless carrier network, as well as other telecommunication and/or data communication networks. The sensors 204 may include a proximity sensor, a compass, an accelerometer, and/or a global positioning system (GPS) sensor. The proximity sensor may detect movement of objects that are proximate the user device 106. The compass, the accelerometer, and the GPS sensor may detect orientation, movement, and geolocation of the user device 106.

The user interface 206 may enable a user to provide inputs and receive outputs from the user device 106. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 212 may include other hardware that is typically located on a user device. For example, the device hardware 212 may include signal converters, antennas, modems, hardware decoders and encoders, graphic processors, a subscriber identity module (SIM) card slot, and/or the like that enable the user device 106 to execute applications and provide telecommunication and data communication functions. A SIM card may be inserted into the SIM card slot of the user device 106. Accordingly, the SIM card may enable the user device 106 to obtain telecommunication and/or data communication services from the telecommunication carrier.

The one or more processors 208 and the memory 210 of the user device 106 may implement an operating system 214, device software 216, and one or more applications 218. The operating system 214 may include components that enable the user device 106 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with a modem of the user device 106. Additionally, the operating system 214 may include an application program interfaces (APIs), a command line interface (CLI), and/or an operating system shell that provides access to the functionalities of the operating system 214 and applications 218. Accordingly, the power consumption analyzer 104 may direct the operating system 214 and/or the applications 218 to perform specific tasks via the action commands 122. For example, with respect to the Android operating system, the action commands 122 may be Android Debug Bridge (ADB) commands that are injected into the user device 106 via the Android shell. In instances in which the user device 106 interfaces with the computing device 114 via a USB interface, the operating system 214 may be modified so that charging of the user device 106 is disable in order for the power consumption analyzer 104 to function properly. Otherwise, the USB interface may automatically attempt to charge the user device 106 while the device is connected to the computing device 114. Such automatic charging may result in inaccurate power consumption measurements for the user device 106. For example, USB charging may be disabled via modification of files in the subfolder "/sys/class/power supply/device/" on some Android devices.

The device software 216 may include software components that perform functions and control hardware components of the user device 106. In some embodiments, the device software may include device monitoring software, debugger software, data collection software, and/or data transfer software that collects and/or transmits the device event data 128 to the power consumption analyzer 104. For example, the device software 216 may include a packet analyzer (e.g., TCPDump) that provides data packet download and upload status to the power consumption analyzer 104.

The applications 218 may include applications that provide utility, entertainment, and/or productivity functionalities to a user of the user device 106. For example, the applications 218 may include telephony applications, electronic mail applications, remote desktop applications, web browser applications, navigation applications, office productivity applications, media streaming applications, customer service applications, data collection applications, and/or so forth. Accordingly, the testing of the user device 106 for power consumption may involve using the action commands 122 to simulate the usage of such application.

The computing device 114 may include a communication interface 220, one or more processors 222, memory 226, and server hardware 224. The communication interface 220 may include wireless and/or wired communication components that enable the servers to transmit data to and receive data. The server hardware 224 may include additional hardware that performs user interface, data display, data communication, data storage, and/or other server functions.

The memory 226 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 222 and the memory 226 of the computing device 114 may implement an operating system 228 and the power consumption analyzer 104. The operating system 228 may include components that enable the computing device 114 to receive and transmit data via various interfaces (e.g., user controls, communication interface, and/or memory input/output devices), as well as process data using the processors 222 to generate output. The operating system 228 may include a presentation component that presents the output (e.g., display the data on an electronic display, store the data in memory, transmit the data to another electronic device, etc.). Additionally, the operating system 228 may include other components that perform various additional functions generally associated with an operating system.

The power consumption analyzer 104 may include a test configuration module 230, a test controller module 232, a data analysis module 234, and a data report module 236. These modules may include routines, program instructions, objects, and/or data structures that perform particular tasks or implement particular abstract data types.

The test configuration module 230 may be used to perform the test configuration 116. During the test configuration 116, the test configuration module 230 may prepare a script that prompt the user device 106 to perform a test sequence and prompt the power monitor 102 to monitor the power consumption of the user device 106 during the test sequence. Accordingly, test configuration module 230 may provide a script editor interface that enables a user to create the script or modify the script. Alternatively or concurrently, the test configuration module 230 may also provide a user interface that enables a script to be imported for execution. In one example, a script may contain the following actions, in which the "|numerical value|" specifies the duration of each action:

Make Call|30|
End Call|20|
Open Calculator|30|
Close Calculator|20|
Screen Off|750|
Screen On|30|
Bluetooth On|30|
Bluetooth Off|20|

Furthermore, the test configuration module 230 may provide a configuration interface that enables user to define the order in which actions in a script may be executed. In some embodiments, the configuration interface provided by the test configuration module 230 may also enable the selection of one or more individual actions in a test sequence for performance. In this way, power consumption monitoring may be done for individual actions in a test sequence rather than an entire test sequence. Additionally, a selected test sequence or one or more selected actions may be configured to run for any time duration or repeated any number of time, i.e., test passes.

The test controller module 232 may perform device testing 120 by transforming each action of a test sequence into a corresponding action command that is performed by an application on the user device 106. Further, the test controller module 232 may also generate a corresponding monitoring command for each action command. The action commands are sent to the user device 106 and the monitoring commands are sent to the power monitor 102. For example, the test controller module 232 may generate the following commands:

Power Monitor Starts capturing
Captures for btwn_Seconds seconds
Turn WiFi On for 30 Seconds
Stop Power Monitor Capture
Power Monitor Starts capturing
Captures for btwn_Seconds seconds
Turn WiFi Off for 20 seconds
Stop Power Monitor Capture
Power Monitor Starts capturing
Captures for btwn_Seconds seconds
Open Calculator for 30 seconds
Stop Power Monitor Capture
Power Monitor Starts capturing
Captures for btwn_Seconds seconds
Close Calculator for 20 seconds
Stop Power Monitor Capture In this example, the "Btwn_Seconds" may be "30 seconds". The action commands in this example directs the user device to turn on its Wi-Fi transceiver for 30 seconds, then turn off the Wi-Fi transceiver for 20 seconds. Subsequently, a calculator application on the user device is directed by action commands turn on for 30 seconds, then turn off for 20 seconds. Additionally, the monitoring commands in this example directs the power monitor 102 to capture the power consumption of the user device for each action that is performed.

The test controller module 232 may send the action commands and the monitoring commands for actions, test sequences, or passes until a desired power consumption testing of a user device is complete. The test controller module 232 may receive device event data for each test pass in which a test sequence or one or more actions are performed by a single or multiple applications on the user device 106. Accordingly, the device event data 128 may include an event data file that is recorded for each action, for each test sequence, or for multiple passes of an action or test sequence, depending on the nature of the power consumption test that is configured via the test configuration module 230. As a result, the test controller module 232 may receive a corresponding power consumption data file from the power monitor 102 for each device event data file.

In various embodiments, the performance of a test sequence or one or more actions may trigger a user device to perform functions that consume power in different ways. In some instances, actions or test sequences may directly trigger an application to perform functions. For example, such functions may include causing an application to download or upload data, providing input to an application, causing an application to process data, turning on and off an application feature or a device component, and/or so forth. In other instances, actions or test sequences may indirectly trigger an application to perform functions. For example, the application may be a background application that execute in the background to monitor usage, health, performance, etc. of the user device. Accordingly, as the actions or test sequences cause a user device to performance tasks, the background application may be triggered to perform monitoring, data collection, and/or data uploading functions. Thus, while the actions or test sequences may not directly command the background application to perform functions, the net effect is that the background application will perform functions as a result of the actions or test sequences.

In one particular scenario, a user device that is a mobile phone may be equipped with a background application that monitors data packet loss during Voice over LTE (VoLTE) calls. Thus, a test sequence may trigger the mobile phone to initiate a VoLTE call in a geographical area with poor network coverage from a wireless communication network. As a result, the background application may be triggered to send data to the wireless communication network. The data may contain information that indicates the geolocation of the packet loss, the amount of packet loss, the time duration of the packet loss, the signal strength of the network cell at time of the packet loss, and/or so forth. However, other background applications may perform such monitoring, data collection, and data reporting functions for other types of data communication activities that are triggered by actions and test sequences, such as Video over LTE (ViLTE) calling, web browsing, messaging, emailing, and/or so forth.

The data analysis module 234 may perform the test result analysis 134 using the device event data and the power consumption data for each power consumption test. In some embodiments, the power consumption analyzer 104 may user the device event data and the energy consumption data to determine the amount of power that is consumed for a specific test sequence or a particular action in a test sequence. The amount of power that is consumed may be compared to an expected amount of power that is stored in a battery of the user device to determine how the power consumption affects battery life. For example, the analysis may show that performing a sequence of actions is expected to consume 10% of the total power stored in a battery, or that performing a particular action (e.g., make a phone call) is expected to consume 2% of the total power stored in the battery.

In additional embodiments, the power consumption analyzer 104 may also use the device event data and the power consumption data from multiple test passes of a particular test sequence or a particular to provide an average power consumption for the particular test sequence or the particular action. In this way, the accuracy of the power consumption result for the particular test sequence or the particular action may be enhanced.

In other embodiments, power consumption result may be obtained for a particular test sequence or a particular action that is performed using a first application on a user device. Such power consumption result may be compared by the power consumption analyzer 104 with power consumption result that are obtained for the particular test sequence or the particular action on the user device that is performed using a second application. The first application and the second application may be application that differ in version number, or they may be applications that serve the same purpose but are produced by different software developers (e.g., Internet Explorer vs. Chrome). One of the applications may be a control application, and the other application may be a test application. Accordingly, the comparison of the power consumption result may show the power efficiency of different applications during the execution of the same test sequence or the one or more actions. In some instances, the power consumption result for the test application over a time period may be further correlated by the data analysis module 234 with bug report data for the same time period. In this way, the correlation may show the effect of application errors on the power consumption of the user device.

The data analysis module 234 may also analyze the consumption result for an identical test sequence or one or more identical actions that are performed on different user devices. The user devices may be different versions of the same device. Alternatively, the user devices may be devices that are produced by different manufacturers. The comparison of the power consumption result may show the power efficiency of different devices during the execution of the same test sequence or the one or more actions.

The data analysis module 234 may also analyze the power consumption result for the user device over a time period with power consumption result for a device component over the time period. In various embodiments, a link layer analyzer application residing on the user device may obtain RRC state change information for a RRC/RLC Layer of the user device over the time period. The RRC state change information may be obtained from diagnostic monitoring logs generated by the user device, such as Qualcomm Extensible Diagnostic Monitor (QxDM) logs. Accordingly, the link layer analyzer application may obtain a power level for each RRC state, and thus calculate the power consumed by the radio transceiver of the user device. Accordingly, the data analysis module 234 may provide a comparison of power consumption by the device component with respect to the overall power consumption of the user device as a test sequence or one or more actions are performed on the user device.

In other implementations, the data analysis module 234 may analyze the power consumption of a first user device that has a background application installed against the power consumption of a second user device that does not have the background application installed in a time interval. The first user device and the second user device may be identical in every way except for the presence and absence of the background application. Further, the first and second user devices may execute one or more actions in identical or similar conditions. For example, the identical or similar conditions may include time of day, geographical location, physical address, wireless communication network signal strength, and/or so forth. In this way, the data analysis module 234 may assess the impact of the background application on the power consumption of the user device during the performance of a test sequence or one or more actions. In at least one embodiment, the difference in power consumption by the first user device and the second user device in performing the one or more actions under the similar or identical conditions may be the power consumption of the background application in the time interval.

In one scenario, the background application may monitor data packet loss during VoLTE calls. The test sequence or the one or more actions may trigger both device to make identical outgoing VoLTE calls in a poor network reception area. On the user device with the background application, the background application may detect packet loss and automatically send data to the wireless communication network concerning the packet loss. The testing of the two user devices using the test sequence or one or more actions may generate power consumption result for each user device. The data analysis module 234 may compare the power consumption result to determine a difference in power consumption. In this way, if the user device with the background application consumes more power than the user device without the background application, the difference is attributable to the additional power consumed by the background application. Thus, while the ability of the background application to report VoLTE packet losses to the network provides an overall benefit, the additional power consumption burden of the background application on the user device, if significant, may be a detriment. The data analysis module 234 may perform additional analysis for the power consumption burden of the background application, such as plotting the power consumption burden as a curve over the time interval to identify multiple power consumption features.

The data analysis module 234 may further correlate the power consumption result of a user device with respect to the downloading of data from a network or the uploading of data to a network. The data may be downloaded or uploaded for various data and voice communications, such as VoLTE, Video over LTE (ViLTE), email, text messages, web pages, and/or so forth. The power consumption result and the data traffic logs for actions that download or upload data performed over a time period may be compared by the data analysis module 234. For example, the data traffic logs may be the PCAPs that are generated by the Android operating system. The comparison may show an amount of power that is consumed by each data downloading or uploading action. In some instances, the comparison may show an amount of power that is consumed for each of multiple webpages that are downloaded to the user device via a web browser. In some instances, the multiple webpages may include an original web page and a streamlined version of the original web page. The streamlined version may be configured to present the information in the original web page using the least amount of uploaded data requests and/or downloaded data packets. For example, tracking cookies, multimedia content, interactive content, etc. may be eliminated from the streamlined version. Accordingly, the comparison may show the difference in power consumption when the user device downloads the original web page and the streamlined version of the web page. In some instances, the power consumption for a web page may also be compared to a page load time and/or a user-perceived loading latency for the web page. The page load time and the user-perceived loading latency for the web page may be aspects of quality of user experience (QoE). Thus, the data analysis module 234 may determine whether positive or negative correlations exists between power consumption and a QoE measurement, such as between power consumption and page load time, or between power consumption and user perceived latency. Thus, the data analysis module 234 may determine whether positive or negative correlations exists between power consumption and a QoE measurement.

Additionally, the data analysis module 234 may analyze the power consumption result of a user device with respect to the network error events experienced by the user device in a specific time period. The network error events may have occurred when the user device is using a particular wireless communication network. As such, the data analysis module 234 may determine an additional amount of power that is consumed by the user device due to the network error events. In at least one embodiment, the data analysis module 234 may receive a data traffic log that identifies multiple data streams, such as transmission control protocol (TCP) streams. For example, the data traffic log may be the PCAP that is generated by the Android operating system. Subsequently, the data analysis module 234 may group the multiple data steams into groups according to tasks. The task may be the downloading or uploading of specific data to perform a function, such as downloading a web page, transmit a text message, send an email, uploading a social posting, etc. For instance, multiple data streams may be grouped together as for accomplish a particular task when Domain Name System (DNS) lookups on the packet traces of the data streams indicate that the set of data streams share a common destination Universal Resource Locator (URL). In other instances, multiple data streams may be grouped together according to a common destination Internet Protocol (IP) address or a common destination media access control (MAC) address.

Following the grouping of the data streams, the data analysis module 234 may analyze network error events that are captured in the data traffic log for each group of data streams. Such analysis may provide an amount of data additional data packets that are transmitted or received due to each network error event. In various embodiments, network error events may result in the retransmission of data packets. The retransmission of data packets for each data stream may be recorded in the data traffic log. Accordingly, the analysis may provide an amount of additional data packets that are used to accomplish a corresponding task due to the network error events. The network error events may include transmission retries, lost data packets, duplicate data packets, connection timeouts, and/or so forth. The time that each network error event occurred in a time period may be captured in the data traffic log. The data analysis module 234 may use the times of the network error event to correlate each event to power consumption spikes captured in power consumption data for the time period.

As a result, the data analysis module 234 may calculate the amount of additional power consumed by the user device due to the transmission of the additional data packets based on the magnitude of the power consumption spikes. The calculation may be performed based on the current value of the power consumption spike and the time duration of the spike. For example, if the transmission of 100 data packets a particular time coincides with a power consumption spike of 600 milliamps (mA) for a duration of 0.2 seconds, the data analysis module 234 may calculate the amount of additional power, e.g., mAh, consumed for the transmission of the 100 data packets. In this way, the data analysis module 234 may calculate the amount of additional power consumed due to network error events for every group of data streams captured in the data traffic log within the specific time period. Furthermore, the data analysis module 234 may determine the power consumption cost to the user device, or a group of similar user devices, due to a particular network configuration setting or a particular network configuration error of the particular wireless communication network. In another implementation, rather than analyzing network error events, the data analysis module 234 may use the power consumption result and the data traffic log to calculate the amount of power that is consumed to accomplish each task. The data analysis module 234 may perform such calculation by using time information captured in the power consumption result and the data traffic log to ascertain the power consumed by each data stream that is associated with a task, and sum the total power consumed for the data streams associated with the task.

The data report module 236 may generate reports that provide the analysis results 138. The data report module 236 may route the reports to multiple recipients based on the directions of an administrator. The reports may enable network engineering to correct network problems. The reports may also serve as the basis for customer service staff to troubleshoot or remedy data interruptions experienced by the users of user devices in an expedient manner. In some instances, the reports may be routed to third party service providers to help such providers to resolve problems with their networks or systems that may be causing data interruption to the user devices serviced by the telecommunication carrier. The reports may present various correlations of different types of device event data, power consumption data, and/or network data in various forms, such as graphical and/or numerical forms. A sample graphical report that shows analysis results in shown in FIG. 4.

The data store 238 may store data that are used or generated by the various modules of the power consumption analyzer 104. The data store 238 may include one or more databases, such as relational databases, object databases, object-relational databases, and/or key-value databases. In at least some embodiments, the data store 238 may store scripts 240, device event data 242, power consumption data 244, and analysis results 246 that are used for the power consumption testing and analysis of user devices.

Example User Interfaces and Analysis Report

Figure 3:
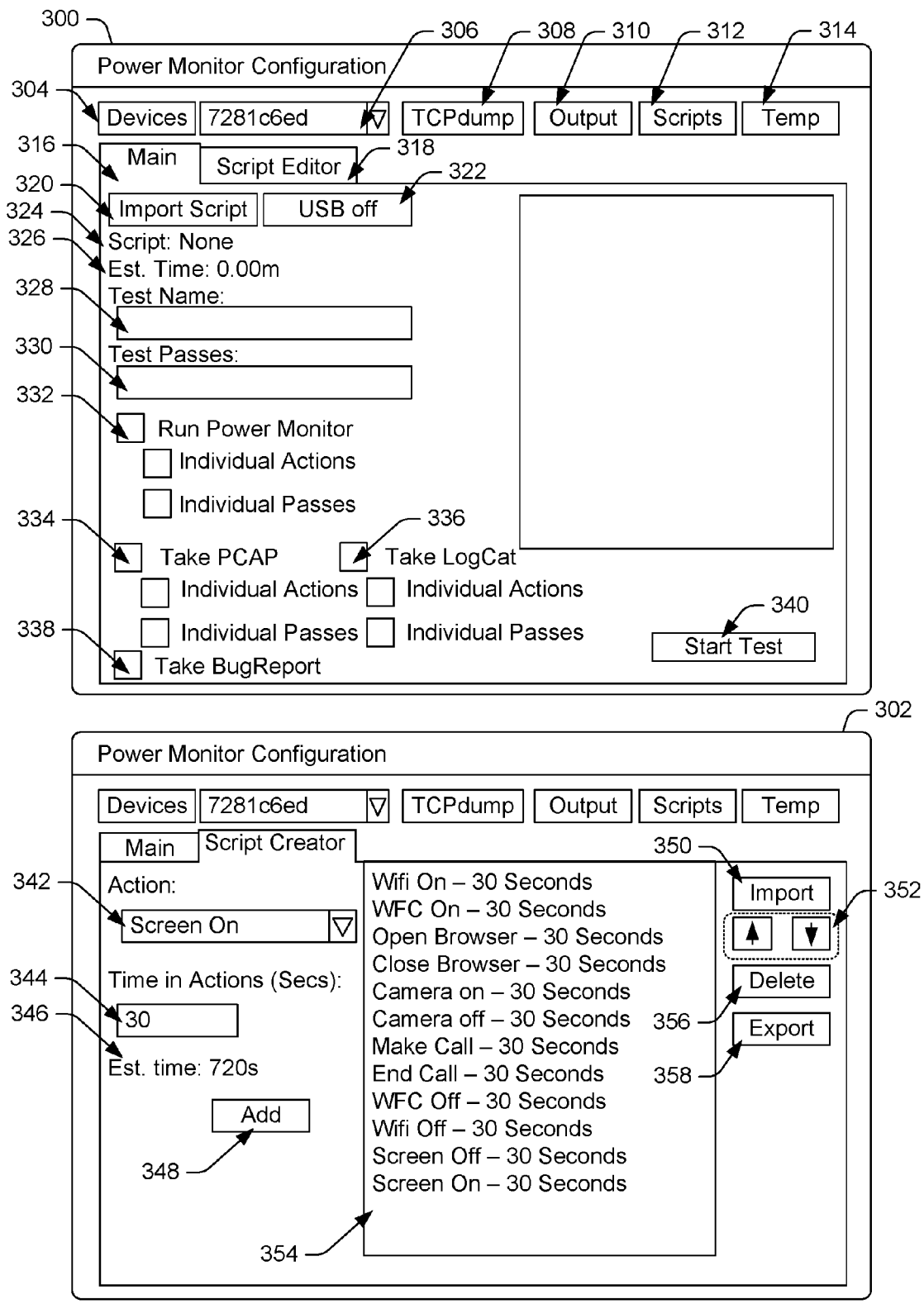
FIG. 3 illustrates example user interfaces provided by a power consumption analyzer for initializing a power consumption test of a user device.

FIG. 3 illustrates example user interfaces provided by a power consumption analyzer for initializing a power consumption test of a user device. The example user interfaces 300 and 302 may be presented by the power consumption analyzer 104 to configure the execution of a power consumption test. The user interface 300 may include a device button 304 that may be activated by a user to search for user devices that are connected to the computing device 114. The selection control 306 may be a drop down menu that enables the user to select a connected user device for testing. The packet analyzer button 308 may be activated to install and execute a packet analyzer on the user device, in which the packet analyzer will generate corresponding data traffic logs for actions or test passes. The user interface 300 may further include an output button 310, a scripts button 312, and a temp button 314. The output button 310 may be activated to direct a user to browse to an output folder where the analysis results 138 are stored. Likewise, the scripts button 312 may be activated to direct a user to a default location where the scripts are located. Further, the temp button 314 may be activated to direct a user to a temporary folder where raw data obtained by the power consumption analyzer 104 are stored.

The user interface 300 may include a main tab 316 and a script creator tab 318. As shown in the user interface 300, the main tab 316 may include an import script button 320 and a USB control button 322. The import script button 320 may be activated by the user to import a script into the testing environment. Further, the USB control button 322 may be activated to automatically disable USB charging for a user device. The name field 324 of the user interface 300 may display a name of a selected script, while the estimated time field 326 may display the estimated time to complete one pass of the script. The test name input field 328 may be used set a name for the output folder that will contain the test results. Further, the test passes input field 330 may be used to set the number of test passes of a selected test script.

The user interface 300 may further include a power monitor control 332, a PCAP control 334, a LogCat control 336, and a bug report control 338. The power monitor control 332 may be a selection box that is used to turn on or turn off power monitoring. The power monitoring control 332 may be further equipped with sub-selection boxes that provides the user with the ability to choose the execution of an entire test sequence, individual passes, or individual actions. Thus, by choosing the run power monitoring without choosing either "individual actions" or "individual passes," the power consumption analyzer 104 may record a single power consumption data file that covers all actions and all test passes. Essentially, this selection may start the power consumption analyzer 104 at the beginning of the test and terminate when the last action on the last test pass has been performed. As a result, the power consumption analyzer 104 records one power consumption data file regardless of the number of actions or passes executed. However, if the "individual passes" option is selected, then power consumption analyzer 104 may start recording a power consumption data file at the beginning of each test pass. For example, if the user selects five test passes, the power consumption analyzer 104 will generate five separate files. Further, if the "individual actions" option is selected, the power consumption analyzer 104 will record a new power consumption data file for every action listed in a test script.

The PCAP control 334 may be a selection box that is used to turn on or turn off the recording of PCAP files from a user device. The PCAP control 334 may be further equipped with sub-selection boxes that provides the user with the ability to selection the recording of a data traffic log for an entire test sequence, individual passes, or individual actions. Thus, by choosing "Take PCAP" without choosing either "individual actions" or "individual passes," the power consumption analyzer 104 will record a single PCAP file for all actions and test passes. In other words, the power consumption analyzer 104 may start the packet analyzer at the beginning of the test and terminate the packet analyzer when the last action on the last test pass has been performed. As a result, the power consumption analyzer 104 may record one PCAP file regardless of the number of actions or passes executed. However, if the "individual passes" option is selected, then the power consumption analyzer 104 may start recording a PCAP file at the beginning of each test pass. For example, if the user selects five test passes, the power consumption analyzer 104 will generate five separate PCAP files. Further, if the "individual actions" option is selected, the power consumption analyzer 104 will record a new PCAP file for every action listed in a test script.

The LogCat control 336 may be a selection box that is used to turn on or turn off the recording of LogCat files from a user device. This selection box and the corresponding sub-selection boxes for "individual actions" and "individual passes" may behave the same way as the PCAP control 334. The bug report control 338 may be used a selection box that is used to turn on or turn off the recording of bug reports from the user device. The start test control 340 of the user interface 300 may be used to start a power consumption test.

The user interface 302 may provide a script editor that enable a user to configure power consumption tests that are to be executed. The action selection control 342 may be a drop down menu that enables the user to select an action to be added to a script. The time input field 344 may enable the entry of the time to wait following the execution of an action, while the estimated time field 346 may display the estimated total execution time for a script. The add action control 348 may be activated to add an action that is selected via the action selection control 342 to a script. The import control 350 may be activated to access a user interface that enables the importation of a script from a storage location (e.g., a script folder) into the script editor. The up/down control 352 may be used to move an action that is displayed in the script display window 354 higher or lower in the script sequence. The user interface 302 may further include a deletion control 356 and an export control 358. The deletion control 356 may be activated to delete an action from the script that is shown in the script display window 354. The export control 358 may be activated to access a user interface that enables the saving of a script to a storage location, such as a script folder.

Figure 4:
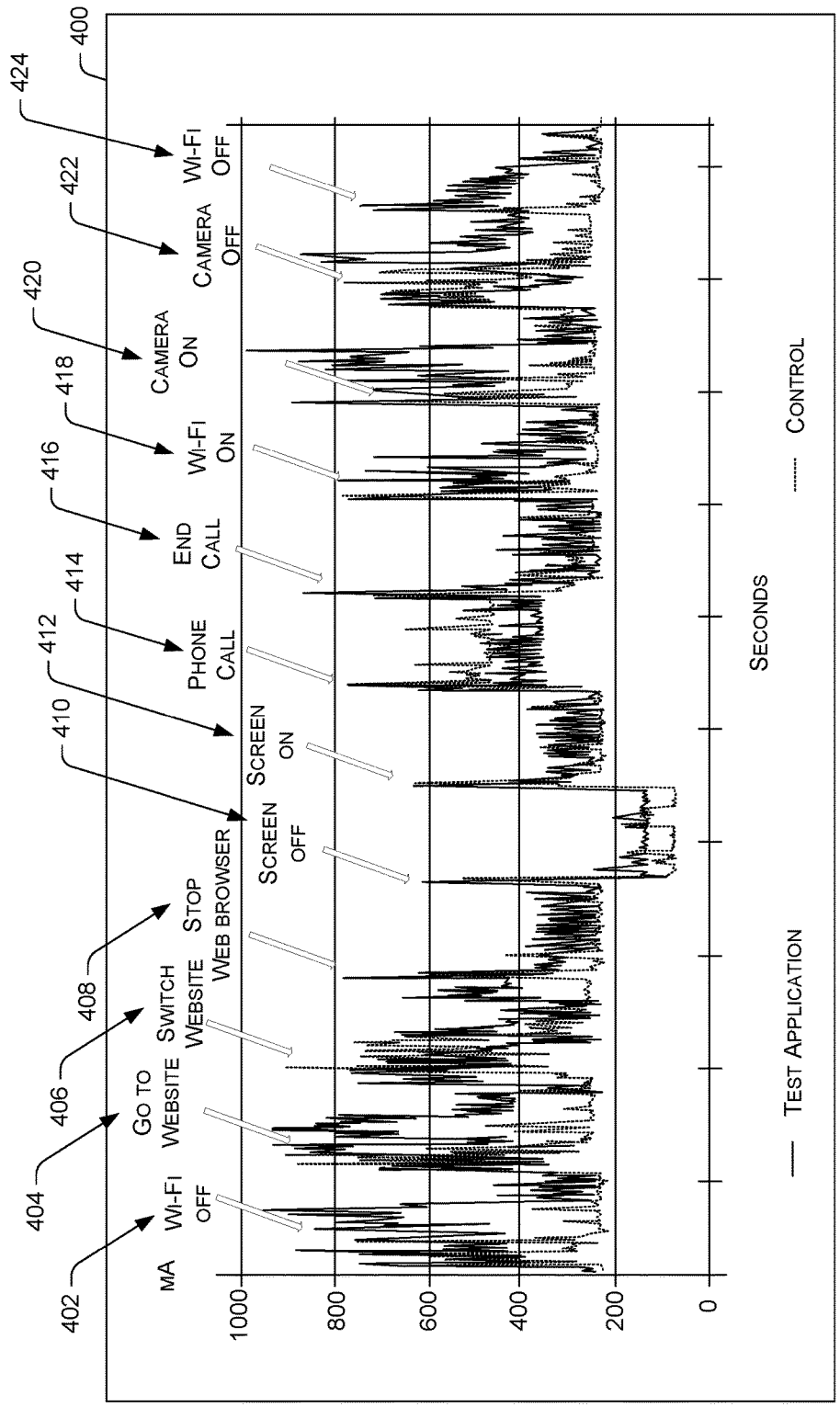
FIG. 4 illustrates an example analysis report that is generated by the power consumption analyzer.

FIG. 4 illustrates an example analysis report 400 that is generated by the power consumption analyzer 104. The example analysis report 400 may be a graph that charts the difference between the power consumption of a first user device that has a test application installed and a second user device that does not have the test application installed. The graph shows the difference in power consumption between the two user devices as the devices undergo a test sequence of actions over time. For example, actions for which the power consumption of the user devices may differ may include turning a Wi-Fi transceiver of the user device off 402, navigation to a particular website using a web browser 404, switch to a different web site 406, terminating the execution of the web browser 408, turning the screen of the user device 410, and turning the screen of the user device back on 412.

The actions may further include initiating a phone call 414, ending the phone call 416, and turning the Wi-Fi transceiver of the user device back on 418, turning a camera of the user device on 420, turning the camera of the user device off 422, and turning the Wi-Fi Transceiver of the user device off 424. For the purpose of the graph, the time may be expressed in seconds, and the difference in power consumption between the two devices may be expressed in milliamps (mA).

Example Processes

FIGS. 5-9 present illustrative processes 500-900 for implementing user device power consumption monitoring and analysis. Each of the processes 500-900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-900 are described with reference to the architecture 100 of FIG. 1.

Figure 5:
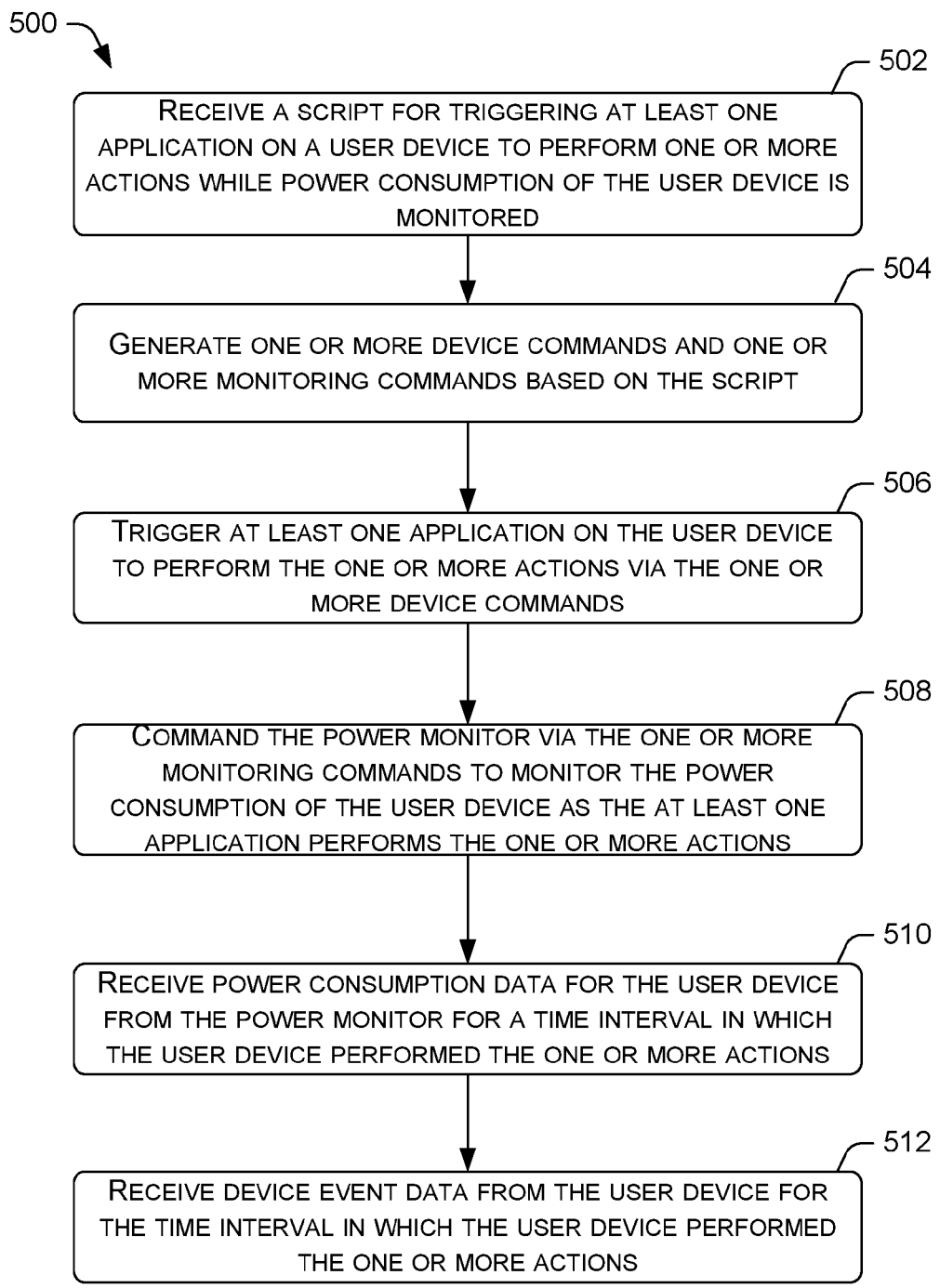
FIG. 5 is a flow diagram of an example process for a power consumption analyzer to monitor the power consumption of a user device during the simulated usage of the user device.

FIG. 5 is a flow diagram of an example process 500 for a power consumption analyzer to monitor the power consumption of a user device during the simulated usage of the user device. At block 502, the power consumption analyzer 104 may receive a script for trigger at least one application the user device 106 to perform one or more actions while power consumption of the user device is monitored. The one or more actions may include downloading or uploading data, receiving input at an application, processing data using an application to generate output data, turning on and off an application feature or a device component, and/or so forth. The power consumption of the user device 106 may be monitored by the power monitor 102.

At block 504, the power consumption analyzer 104 may generate one or more device commands and one or more monitoring commands based on the script. The one or more device commands may cause the user device 106 to perform the one or more actions, while the one or more monitoring commands may cause the power monitor 102 to monitor the power of the consumption of the user device 106 as the one or more actions are performed.

At block 506, the power consumption analyzer 104 may trigger at least one application on the user device 106 to perform one or more actions via the one or more device commands. In some embodiments, the one or more device commands may trigger an application by directly commanding the application to perform an action. In other embodiments, the one or more device commands may indirectly trigger an application to perform an action by commanding one or more other applications that are being monitored or used by the application to perform at least one action. At block 508, the power consumption analyzer 104 may command the power monitor via the one or more monitoring commands to monitor the power consumption of the user device as the at least one application performs the one or more actions.

At block 510, the power consumption analyzer 104 may receive power consumption data 132 for the user device for a time interval in which the user device performed the one or more actions. The power consumption data 132 may indicate power drain, e.g., amperage drain, over a period of time that coincides with the performance. At block 512, the power consumption analyzer 104 may receive device event data 128 for the time interval in which the user device performed the one or more actions. In various embodiments, the device event data 128 may include system event reports, bug reports, data traffic logs, data packet traces, and/or so forth.

Figure 6:
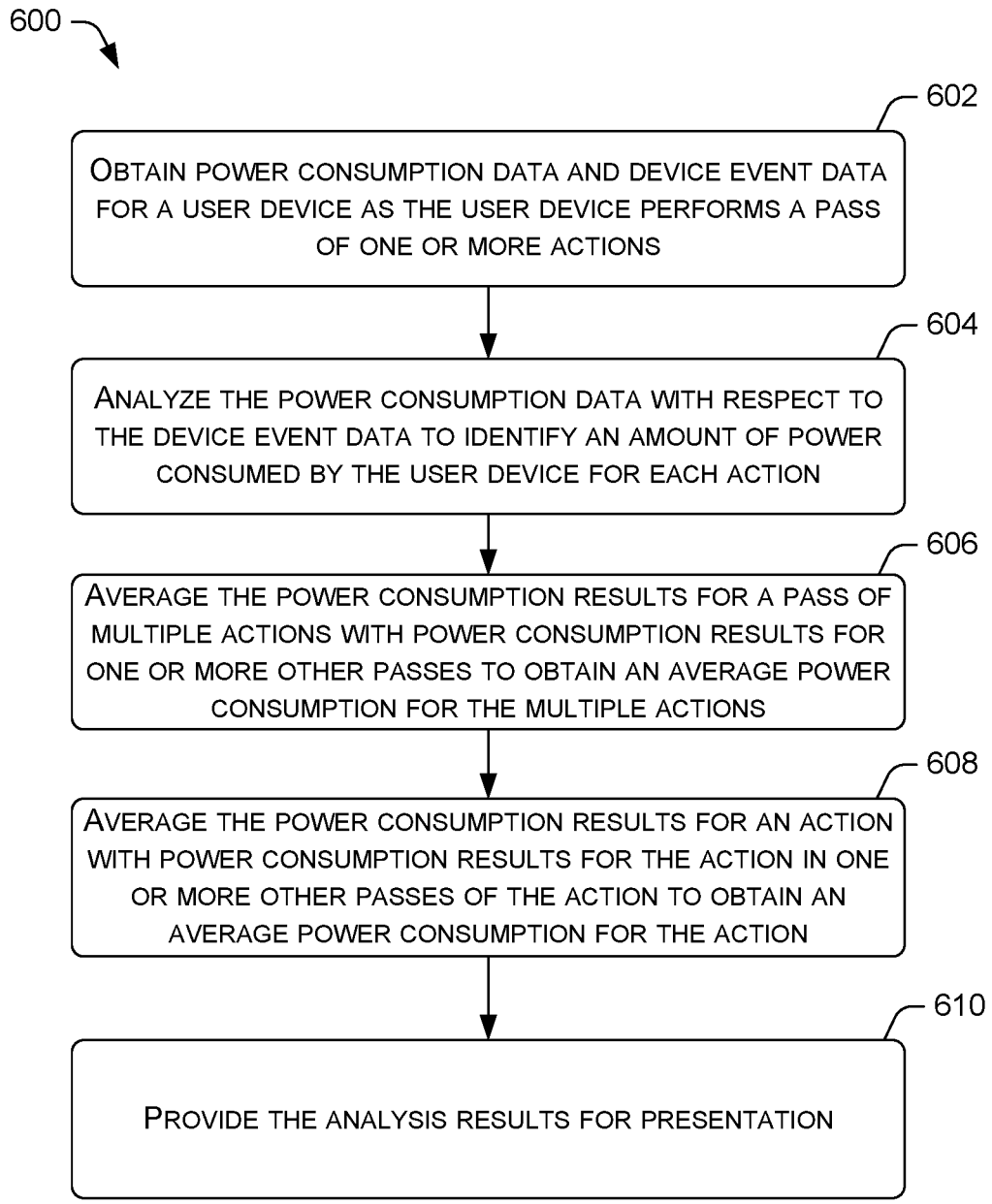
FIG. 6 is a flow diagram of an example process for obtaining average power consumptions of a user device during the performance of a test sequence or an action in the test sequence.

FIG. 6 is a flow diagram of an example process 600 for obtaining average power consumptions of a user device during the performance of a test sequence or an action in the test sequence. At block 602, the power consumption analyzer 104 may obtain the power consumption data and device event data for a user device as the user device performs a pass one or more actions. The one or more actions may simulate the usage of the user device over a period of time. For example, the one or more actions may include downloading or uploading data with respect to a network, receiving input at an application, processing data using an application to generate output data, turning on and off an application feature or a device component, and/or so forth.

At block 604, the power consumption analyzer 104 may analyze the power consumption data with respect to the device event data to identify an amount of power consumed by the user device for each action. For example, if the action is the download of a web page or a web page component, the power consumption analyzer 104 may identify the amount of power consumed to download the web page or the web page component. In another example, if the action is the placement of a VoLTE call, the power consumption analyzer 104 may identify the amount of power consumed for the VoLTE call. In another example, the power consumption analyzer 104 may further identify the amount of power consumed for the download or upload of specific data packets, the activation of a user device component (e.g., a camera, a Wi-Fi transceiver, etc.). In some instances, the device event data may include a web page load time or perceived user latency data.

At block 606, the power consumption analyzer 104 may average the power consumption result for a pass of multiple actions with power consumption result for one or more other passes to obtain an average consumption for the multiple actions. The power consumption result for a pass may indicate the amount of power consumed for the performance of the actions. The average of the power consumption result for the multiple actions, as obtained via the multiple passes, may provide a normalized amount of power consumption for the multiple actions.

At block 608, the power consumption analyzer 104 may average the power consumption result for an action with power consumption result for the action in one or more other passes to obtain an average power consumption for the action. The average of the power consumption result for the action, as obtained via the multiple passes, may provide a normalized amount of power consumption for the action.

At block 610, the power consumption analyzer 104 may provide the analysis results for presentation. In various embodiments, the analysis results may be displayed via a display device or via a printed document in numerical and/or graphical form.

Figure 7:
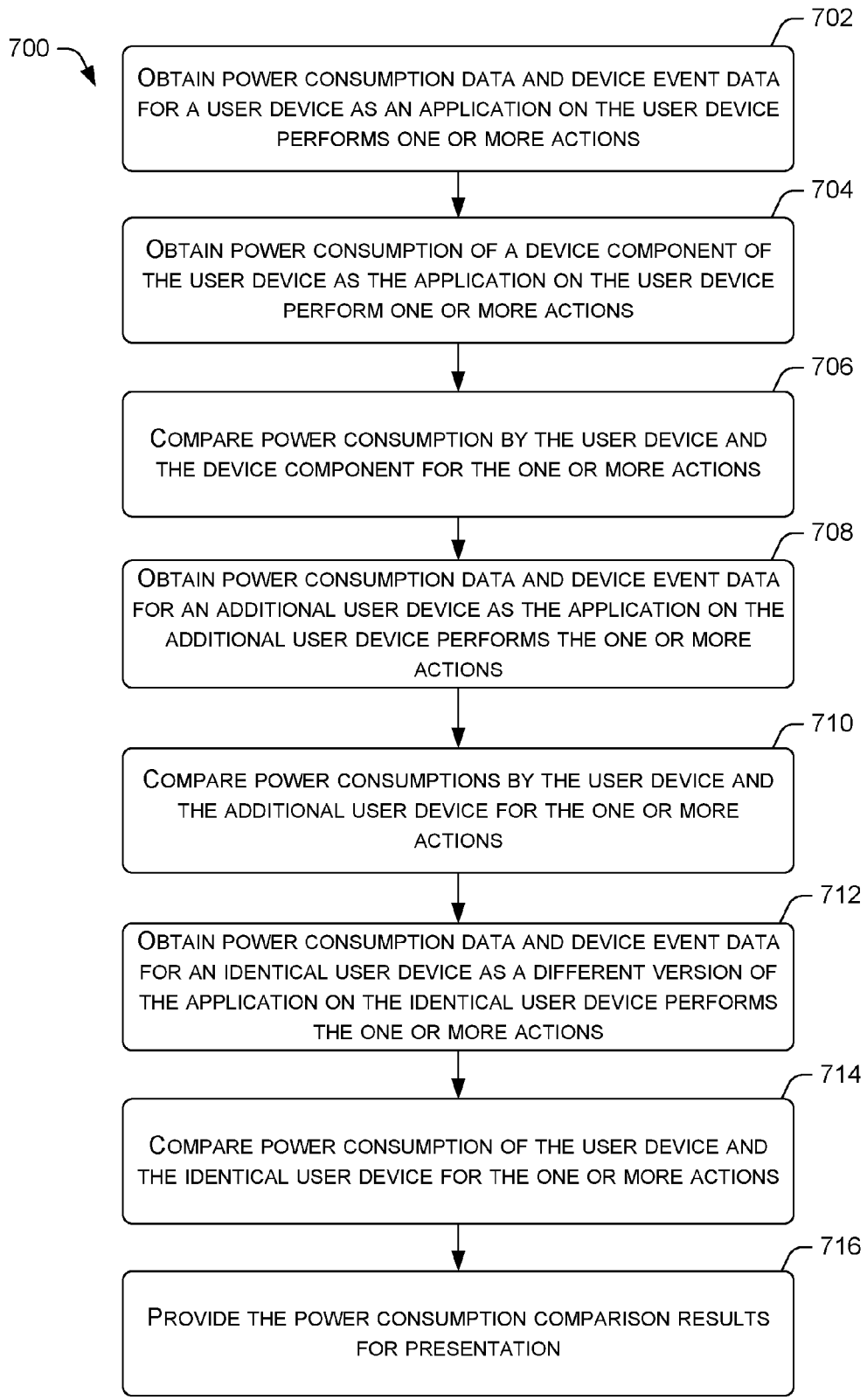
FIG. 7 is a flow diagram of an example process for comparing the power consumption of the user device to other power consumption and performance data.

FIG. 7 is a flow diagram of an example process 700 for comparing the power consumption of the user device to other power consumption and performance data. At block 702, the power consumption analyzer 104 may obtain power consumption data and device event data for a user device as an application on the user device performs one or more actions. For example, the one or more actions may include downloading or uploading data with respect to a network, receiving input at an application, processing data using an application to generate output data, turning on and off an application feature or a device component, and/or so forth.

At block 704, the power consumption analyzer 104 may obtain power consumption of a device component of the user device as an application on the user device performs one or more actions. For example, the device component may be a radio transceiver of the user device, a processor, a display screen of the device, a camera of the device, and/or so forth. At block 706, the power consumption analyzer 104 may compare the power consumption by the user device to the power consumption by the device component of the user device.

At block 706, the power consumption analyzer 104 may compare the power consumption by the user device and the device component for the one or more actions. The comparison may show a positive or negative correlation between the power consumption of the user device and the device component. For example, the comparison may show that power consumption by a particular device component may spike upon a performance of a specific action or a set of actions. In another example, the comparison may show the power consumption by the device component fluctuating as a percentage of the power consumption of the user device as one or more actions are performed.

At block 708, the power consumption analyzer 104 may obtain power consumption data and device event data for an additional user device as the application on the additional user device performs the one or more actions. In various embodiments, the user device may be a tester device and the additional user device may be a control device. For example, the tester device may be a new user device or an updated version of the tester device.

At block 710, the power consumption analyzer 104 may compare power consumption of the user device with the power consumption of the additional user device. In various embodiments, the comparison may show the power efficiency of the user device against the power efficiency of the additional user device for each action. Such comparisons may reveal improvements or shortcomings in the power efficiency of the user device, for the identification of potential problems with power usage in performing certain actions.

At block 712, the power consumption analyzer 104 may obtain power consumption data and device event data for an identical user device as a different version of the application on an identical user device performs the one or more actions. The different version of the application may be an updated version, an older version, or a modified version of the application, and the application may serve as the control version.

At block 714, the power consumption analyzer 104 may compare the power consumption of the user device and the identical user device for the one or more actions. In various embodiments, the comparison may show the power efficiency of the user device with the application against the power efficiency of the identical user device with the additional application for each action. Such comparisons may reveal improvements or shortcomings in the power efficiency of the different version with respect to certain actions. At block 716, the power consumption analyzer 104 may provide the power consumption comparison results for presentation. In various embodiments, the results may be displayed via a display device or via a printed document in numerical and/or graphical form.

Figure 8:
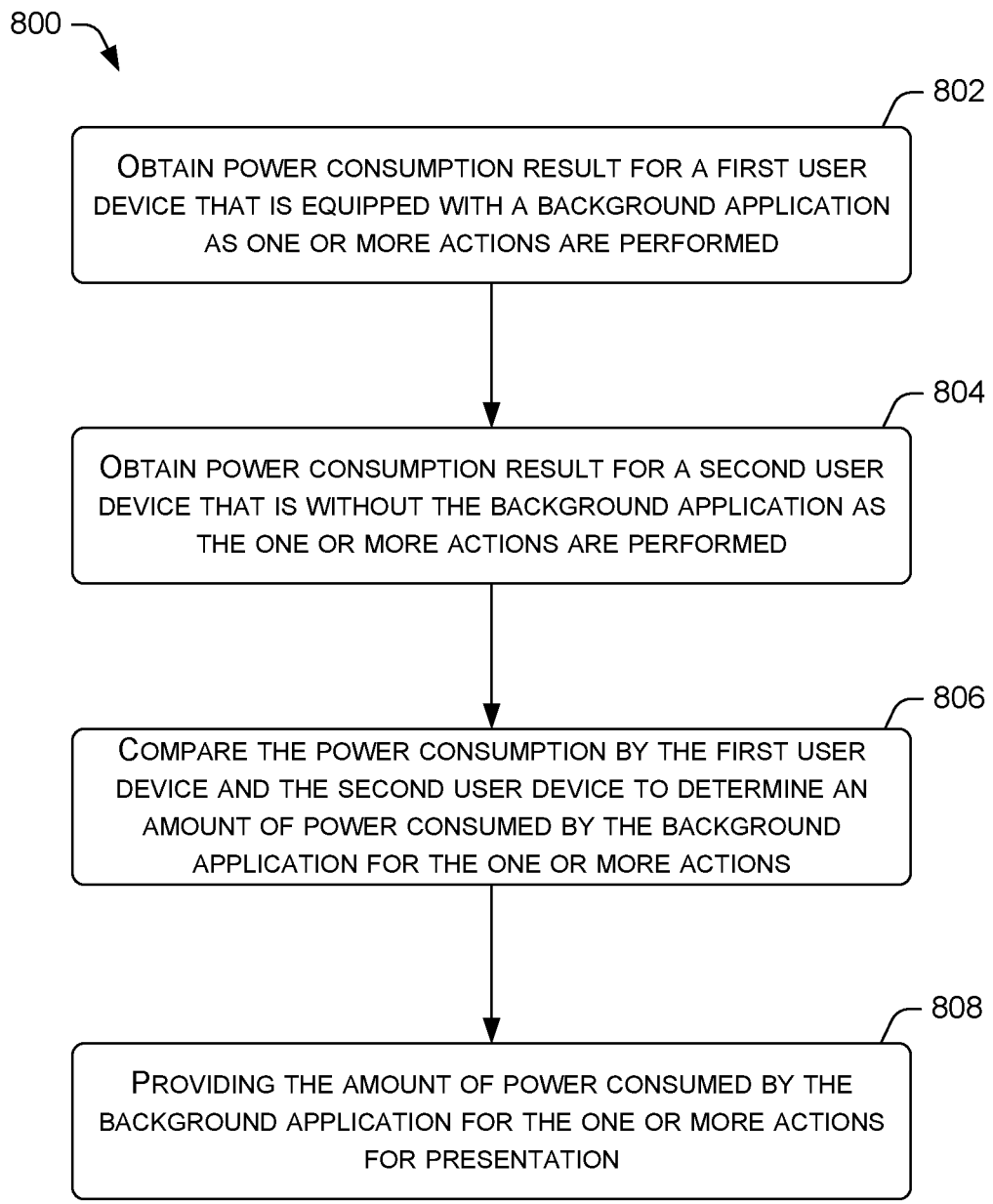
FIG. 8 is a flow diagram of an example process for assessing the power consumption of a background application on a user device due to one or more actions.

FIG. 8 is a flow diagram of an example process 800 for assessing the power consumption of a background application on a user device due to one or more actions. At block 802, the power consumption analyzer 104 may obtain power consumption result for a first user device that is equipped with a background application as one or more actions are performed by the first user device. In various embodiments, the background application may execute in the background to monitor usage, health, performance, etc. of the user device as one or more other applications on the user device performs one or more actions. For example, a user device that is a mobile phone may be equipped with a background application that monitors data packet loss during VoLTE calls. In another example, the background application may collect customer service and application usage and bug report data.

At block 804, the power consumption analyzer 104 may obtain power consumption result for a second user device that is without the background application as the one or more actions are performed. The power consumption result may be obtained as the second user device is operating in identical or similar conditions as the first user device. For example, the identical or similar conditions may include time of day, geographical location, physical address, wireless communication network signal strength, and/or so forth.

At block 806, the power consumption analyzer 104 may compare the power consumption by the first user device and the second user device to determine an amount of power consumed by the background application for the one or more actions. In at least one embodiment, the difference in power consumption by the first user device and the second user device in performing the one or more actions under the similar or identical conditions may be the amount of power consumed by the background application.

At block 808, the power consumption analyzer 104 may present the amount of power consumed by the background application for the one or more actions. In various embodiments, the amount of power consumption by the background application may be displayed via a display device or via a printed document in numerical and/or graphical form for the one or more actions. In some embodiments, the process 800 may be alternatively applied to a non-background application to determine an amount of power consumed by the non-background application. For example, the non-background application may be responsible for performing the one or more actions.

Figure 9:
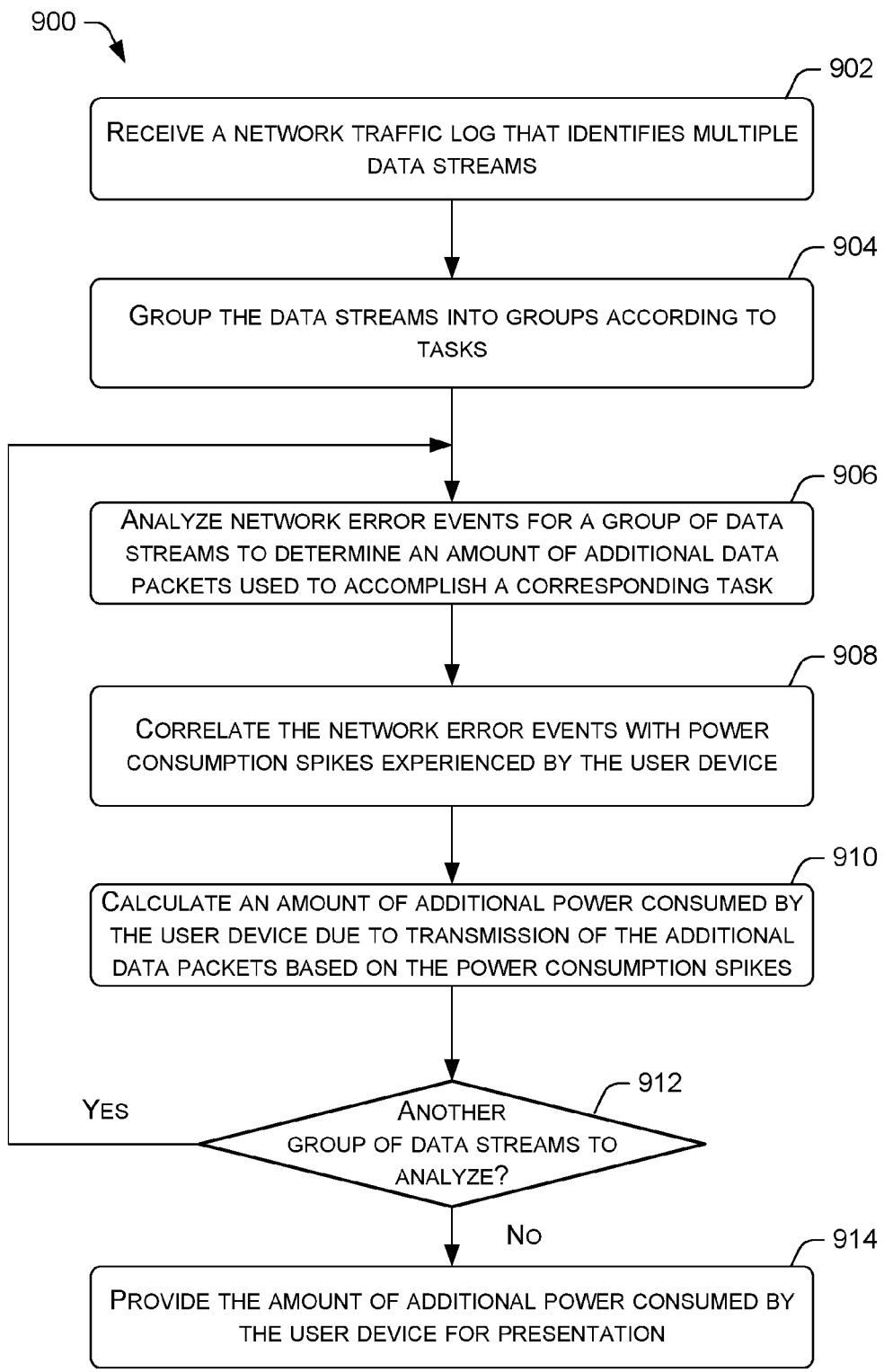
FIG. 9 is a flow diagram of an example process for calculating the additional power consumption of a user device due to network error events.

FIG. 9 is a flow diagram of an example process 900 for calculating the additional power consumption of a user device due to network error events. At block 902, the power consumption analyzer 104 may receive a data traffic log that identifies multiple data streams. In at least one embodiment, the data streams may be TCP streams, and the data traffic log may be the PCAP that is generated by the Android operating system.

At block 904, the power consumption analyzer 104 may group the data streams into groups according to tasks. In some instances, multiple data streams may be grouped together as for accomplish a particular task when Domain Name System (DNS) lookups on the packet traces of the data streams indicate that the set of data streams share a common destination Universal Resource Locator (URL). In other instances, multiple data streams may be grouped together according to a common destination Internet Protocol (IP) address or a common destination media access control (MAC) address.

At block 906, the power consumption analyzer 104 may analyze network error events for a group of data streams to determine an amount of additional data packets used to accomplish a corresponding task. In various embodiments, the network error events may include data packet transmission retries, lost data packets, duplicate data packets, connection timeouts, and/or so forth. Such network error events may result in the retransmission of data packets. The retransmission of data packets for each data stream may be recorded in the data traffic log. Accordingly, the analysis may provide an amount of additional data packets that are used to accomplish a corresponding task due to the network error events.

At block 908, the power consumption analyzer 104 may correlate the network error events with power consumption spikes experienced by the user device. In various embodiments, the time that each network error event occurred in a time period may be captured in the data traffic log. The power consumption analyzer 104 may use the times of the network error event to correlate each event to power consumption spikes captured in power consumption data for the time period.

At block 910, the power consumption analyzer 104 may calculate an amount of additional power consumed by the user device due to transmission of the additional data packets based on the power consumption spikes. In various embodiments, the calculation may be performed based on the current value of the power consumption spike and the time duration of the spike. For example, if the transmission of 100 data packets a particular time coincides with a power consumption spike of 600 milliamps (mA) for a duration of 0.2 seconds, the data analysis module 234 may calculate the amount of additional power, e.g., mAh, consumed for the transmission of the 100 data packets. This amount of additional power consumed is used by the user device to accomplish the task being performed by the group of data streams.

At decision block 912, the power consumption analyzer 104 may determine whether there is another group of data streams associated with another task to analyze. Accordingly, if the power consumption analyzer 104 determines that there are no other group of data streams to analyze ("no" at decision block 912), the process 900 may proceed to block 914. At block 914, the power consumption analyzer 104 may provide the amount of additional power consumed by the user device to accomplish the one or more tasks for presentation, in which the additional power consumed is for retransmitting the data packets. However, if the power consumption analyzer 104 determines that there is another group to analyze ("yes" at decision block 912), the process may loop back to block 906.

The techniques for performing detailed analysis of power consumption by a user device may enable application designers, web developers, network engineers, or other service providers to identify root causes of short battery life for user devices. As a result, applications, web pages, telecommunication network infrastructure, as well other components may be modified or improved to provide optimal battery life for user devices.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    executing a script on one or more computing devices to generate a plurality of action commands for a user device and one or more monitoring commands for a power monitor device, wherein execution of the script is performed by a processor that is separate from the user device, wherein each of the plurality of action commands are configured to trigger at least one application on the user device to perform one or more actions that include at least turning on or off a hardware component of the user device, and wherein the one or more monitoring commands are configured to activate the power monitor device to track power consumption of the user device as the one or more actions are performed by the user device;
    sending a single action command of the plurality of action commands from the one or more computing devices to the user device via a first communication interface between the one or more computing devices and the user device to trigger the at least one application on the user device to perform the one or more actions;
    sending the one or more monitoring commands from the one or more computing devices to the power monitor device via a second communication interface between the one or more computing devices and the power monitor device to command the power monitor device to monitor the power consumption of the user device as the at least one application performs a pass of the one or more actions;
    receiving, at the one or more computing devices via the second communication interface, power consumption data for the user device from the power monitor device for a time interval in which the at least one application on the user device performed the pass of the one or more actions;
    receiving, at the one or more computing devices via the first communication interface, device event data from the user device for the time interval in which the at least one application performed the pass of the one or more actions;
    obtaining additional power consumption data for a second user device as the second user device performs the one or more actions in the time interval, the second user device being equipped with a second application in addition to the at least one application; and
    comparing the additional power consumption data for the second user device to the power consumption data for the user device to determine a difference in power consumption between the user device and the second user device, the difference in power consumption being an amount of power consumed by the second application in the time interval.

2. The computer-implemented method of claim 1, further comprising:
    performing analyzing to generate analysis result, the analyzing including at least one of:
        analyzing the power consumption data and the device event data to determine an amount of power consumed by the user device for at least one action;
        averaging a power consumption result for a plurality of actions in the pass with power consumption result for one or more other passes of the plurality of actions on the user device to obtain an average power consumption of the user device for the plurality of actions; or averaging an additional power consumption result for an action in the pass with additional power consumption result for the action in one or more other passes of the action to obtain an average power consumption for the action.

3. The computer-implemented method of claim 2, further comprising providing the analysis results for presentation in at least one of numerical form or graphical form.

4. The computer-implemented method of claim 1, further comprising:

obtaining power consumption of a device component of the user device as an application on the user device performs one or more actions; and comparing the power consumption by the device component of the user device and a power consumption of the user device from the power consumption data provided by the power monitor device to determine a relationship between power consumptions of the user device and the device component.

5. The computer-implemented method of claim 1, further comprising:

obtaining additional power consumption data and additional device event data for an additional user device as the application on the additional user device performs the one or more actions, the additional user device being different from the user device; and comparing power consumptions by the user device and the additional user device to assess power efficiency of the additional user device against power efficiency of the user device.

6. The computer-implemented method of claim 1, further comprising:

obtaining power consumption data and device event data for an identical user device as a different version of the application on the identical user device performs the one or more actions; and comparing power consumptions by the user device and the identical user device to assess power efficiency of the application against power efficiency of the different version of the application.

7. The computer-implemented method of claim 1, further comprising:

providing the amount of power consumed by the second application in the time interval for the one or more actions for presentation.

8. The computer-implemented method of claim 7, wherein the at least one application includes a telephony application, and wherein the second application monitors data packet loss during Voice over LTE (VoLTE) calls that are made using the telephony application and reports the data packet loss to a wireless telecommunication network that supports of the VoLTE calls.

9. The computer-implemented method of claim 7, wherein the second application performs data collection as the at least one application performs the one or more actions.

10. The computer-implemented method of claim 1, wherein the device event data includes a network traffic log that identifies multiple data streams, further comprising:

grouping a plurality of data streams into group, the plurality of data streams sharing a common universal resource locator (URL), a common Internet Protocol (IP) address, or a common media access control (MAC) address;

analyzing network error events for the group of data streams to determine an amount of additional data packets used to accomplish a corresponding task, the network error events including at least one of a lost data packet event, a data packet transmission retry event, a duplicate data packet event, or a connection time out event;

correlating the network error events with power consumption spikes experienced by the user device;

calculating an amount of additional power consumed by the user device due to transmission of the additional data packets based on current drain and time durations of the power consumption spikes; and presenting the amount of additional power consumed by the user device due to the transmission of the additional data packets.

11. The computer-implemented method of claim 1, wherein the one or more actions further include at least one of: inputting data into an application, activating or deactivating application features of the application on the user device, and initiating and terminating uploading or downloading of data from a network.

12. The computer-implemented method of claim 1, wherein the device event data includes system event reports, bug reports, data traffic logs, data packet traces that are generated by the user device.

13. A system, comprising:

one or more processors; and memory having instructions stored therein, the instructions, when executed by the one or more processors, cause the one or more processors to perform acts comprising:

executing a script to generate a plurality of action commands for a user device and one or more monitoring commands for a power monitor device, wherein execution of the script is performed by the one or more processors that are separate from the user device, wherein each of the plurality of action commands are configured to trigger at least one application on the user device to perform one or more actions that include at least turning on or off a hardware component of the user device, and wherein the one or more monitoring commands are configured to activate the power monitor device to track power consumption of the user device as the one or more actions are performed by the user device;

sending a single action command of the plurality of action commands to the user device via a first communication interface to command the at least one application on the user device to perform the one or more actions;

sending the one or more monitoring commands to the power monitor device via a second communication interface to command the power monitor device to monitor the power consumption of the user device as the at least one application performs a pass of the one or more actions;

receiving power consumption data for the user device from the power monitor device via the second communication interface for a time interval in which the at least one application on the user device performed the pass of the one or more actions;

receiving device event data from the user device via the first communication interface for the time interval in which the at least one application performed the pass of the one or more actions;

obtaining additional power consumption data for a second user device as the second user device performs the one or more actions in the time interval, the second user device being equipped with a second application in addition to the at least one application; and comparing the additional power consumption data for the second user device to the power consumption data for the user device to determine a difference in power consumption between the user device and the second user device, the difference in power consumption being an amount of power consumed by the second application in the time interval.

14. The system of claim 13, wherein the power monitor device is coupled between a power source and the user device to transfer power supplied by the power source to the user device and to generate the power consumption data by tracking a current drain of the user device as the at least one application on the user device performs the one or more actions.

15. The system of claim 13, wherein the action commands are sent to an application program interface (API), a command line interface (CLI), or an operating system shell that provides access to one or more functionalities of the at least one application.

16. The system of claim 13, wherein one or more actions downloads a web page, and where the acts further determining a correlation between power consumption of the user device and a page load time or a user perceived loading latency for the web page.

17. The system of claim 13, wherein the acts further comprise:
performing analyzing to generate analysis result, the analyzing including at least one of:
analyzing the power consumption data and the device event data to determine an amount of power consumed by the user device for at least one action;
averaging a power consumption result for a plurality of actions in the pass with power consumption result for one or more other passes of the plurality of actions on the user device to obtain an average power consumption of the user device for the plurality of actions; or
averaging an additional power consumption result for an action in the pass with additional power consumption result for the action in one or more other passes of the action to obtain an average power consumption for the action; and
providing the analysis result for presentation.

18. The system of claim 13, wherein the acts further comprise:
providing the amount of power consumed by the second application for the one or more actions for presentation.

19. The system of claim 13, wherein the device event data includes a network traffic log that identifies multiple data streams, and wherein the acts further comprise:
grouping a plurality of data streams into group, the plurality of data streams sharing a common universal resource locator (URL), a common Internet Protocol (IP) address, or a common media access control (MAC) address;
analyzing network error events for the group of data streams to determine an amount of additional data packets used to accomplish a corresponding task, the network error events including at least one of a lost data packet event, a data packet transmission retry event, a duplicate data packet event, or a connection time out event;
correlating the network error events with power consumption spikes experienced by the user device;
calculating an amount of additional power consumed by the user device due to transmission of the additional data packets based on current drain and time durations of the power consumption spikes; and
presenting the amount of additional power consumed by the user device due to the transmission of the additional data packets.

20. One or more non-transitory computer-readable media storing computer-executable instructions that upon execution cause one or more processors to perform acts comprising:
executing a script on one or more computing devices to generate a plurality of action commands for a user device and one or more monitoring commands for a power monitor device, wherein execution of the script is performed by the one or more processors that are separate from the user device, wherein each of the plurality of action commands are configured to trigger at least one application on the user device to perform one or more actions that include at least turning on or off a hardware component of the user device, and wherein the one or more monitoring commands are configured to activate the power monitor device to track power consumption of the user device as the one or more actions are performed by the user device;
sending a single action command of the plurality of action commands from the one or more computing devices to the user device via a first communication interface between the one or more computing devices and the user device to trigger the at least one application on the user device to perform the one or more actions;
sending the one or more monitoring commands from the one or more computing devices to the power monitor device via a second communication interface between the one or more computing devices and the power monitor device to command the power monitor device to monitor the power consumption of the user device as the at least one application performs the one or more actions;
receiving, at the one or more computing devices via the second communication interface, power consumption data for the user device from the power monitor device for a time interval in which the at least one application on the user device performed the one or more actions;
receiving, at the one or more computing devices via the first communication interface, device event data from the user device for the time interval in which the at least one application performed the one or more actions;
analyzing the power consumption data and the device event data to determine an amount of power consumed by the user device for at least one action;
providing the amount of power consumed by the user device for the at least one action for presentation;
obtaining additional power consumption data for a second user device as the second user device performs the at least one action, the second user device being equipped with a second application in addition to the at least one application; and
comparing the additional power consumption data for the second user device to the power consumption data for the user device to determine a difference in power consumption between the user device and the second user device, the difference in power consumption being an amount of power consumed by the second application.

* * * * *